US012668240B2

(12) United States Patent
Gupta et al.

(10) Patent No.: US 12,668,240 B2
(45) Date of Patent: Jun. 30, 2026

(54) SYMBIOTIC WARNING METHODS AND SYSTEMS TO WARN NEARBY TARGET ACTORS WHILE DRIVING FOR COLLISION AVOIDANCE

(71) Applicant: Tata Consultancy Services Limited, Mumbai (IN)

(72) Inventors: Shyamsunder Dwarika Prasad Gupta, Pune (IN); Krishnan Kutty Kongasary, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 91 days.

(21) Appl. No.: 18/790,147

(22) Filed: Jul. 31, 2024

(65) Prior Publication Data

US 2025/0065868 A1     Feb. 27, 2025

(30) Foreign Application Priority Data

Aug. 25, 2023     (IN) .............................. 202321057195

(51) Int. Cl.
B60W 30/095 (2012.01)
B60W 10/30 (2006.01)
(Continued)

(52) U.S. Cl.
CPC ........ B60W 30/0956 (2013.01); B60W 10/30 (2013.01); B60W 30/0953 (2013.01);
(Continued)

(58) Field of Classification Search
CPC ....... B60Q 1/525; B60Q 5/006; B60W 10/30; B60W 2050/143; B60W 2050/146;
(Continued)

(56) References Cited

U.S. PATENT DOCUMENTS 7,791,458 B2 *   9/2010   Shimaoka .............. B60Q 1/085
                                                            348/148
9,744,903 B2 *   8/2017   Malone .................. B60Q 1/525
(Continued)

FOREIGN PATENT DOCUMENTS

AU          2019253703 A1     10/2020
DE          102017004826 A1   11/2018

OTHER PUBLICATIONS

Author: Laura García Cuenca, Enrique Puertas, Javier Fernandez Andrés and Nourdine Aliane Title: Autonomous Driving in Round-about Maneuvers Using Reinforcement Learning with Q-Learning Title of the item: Electronics Date: 2019 vol. 8; Issue: 12.

*Primary Examiner* — Babar Sarwar
(74) *Attorney, Agent, or Firm* — Finnegan, Henderson, Farabow, Garrett & Dunner, LLP

(57)                    ABSTRACT

The disclosure relates generally to symbiotic warning methods and systems to warn nearby target actors while driving for collision avoidance. Current ADAS systems are limited in assisting only the driver of the host vehicle in the potential dangers. The present disclosure identifies various driving scenarios and gives necessary warning to the target vehicles, pedestrians, and animals around the host vehicle. A symbiotic warning method involves receiving one or more road contextual parameters to create a 360-degree scene perception of road surroundings of a host vehicle, with one or more actors. Then, estimating one or more 3-dimensional (3-D) scene semantics of each of the one or more actors and detecting one or more priority actors those lead to probable collisions. Further, deciding to generate a symbiotic warning signal, to one or more priority actors, and generating the symbiotic warning signal to one or more priority actors those lead to probable collisions.

18 Claims, 7 Drawing Sheets

(51) Int. Cl.

| | |
|---|---|
| *G06N 3/092* | (2023.01) |
| *G06V 20/56* | (2022.01) |
| *G06V 20/70* | (2022.01) |
| *H04W 4/46* | (2018.01) |

(52) U.S. Cl.
CPC ............. *G06N 3/092* (2023.01); *G06V 20/56* (2022.01); *G06V 20/70* (2022.01); *H04W 4/46* (2018.02)

(58) Field of Classification Search
CPC .......... B60W 30/095; B60W 30/0953; B60W 30/0956; B60W 50/14; G01S 13/931; G01S 17/931; G06N 3/092; G06V 20/56; G06V 20/58; G06V 20/70; G08G 1/162; G08G 1/166; H04W 4/46
See application file for complete search history.

(56) References Cited

U.S. PATENT DOCUMENTS

| | | | | |
|---|---|---|---|---|
| 10,173,577 | B2 * | 1/2019 | Albou | B60Q 1/02 |
| 10,343,601 | B2 * | 7/2019 | Wu | B60Q 3/80 |
| 11,531,100 | B2 * | 12/2022 | Staudinger | G01S 17/933 |
| 11,675,362 | B1 * | 6/2023 | Cserna | G05D 1/0214 |
| | | | | 701/23 |
| 11,835,962 | B2 * | 12/2023 | Halder | B60W 60/00 |
| 2004/0085196 | A1 * | 5/2004 | Miller | B60Q 9/008 |
| | | | | 340/937 |
| 2005/0195383 | A1 * | 9/2005 | Breed | G01S 7/481 |
| | | | | 356/28 |
| 2006/0087416 | A1 * | 4/2006 | Kumabe | B60Q 1/50 |
| | | | | 340/435 |
| 2009/0143986 | A1 * | 6/2009 | Stein | G08G 1/166 |
| | | | | 340/436 |
| 2009/0256698 | A1 * | 10/2009 | Bonilla | B60Q 1/535 |
| | | | | 340/479 |
| 2014/0085106 | A1 * | 3/2014 | Clifford | G08G 1/164 |
| | | | | 340/903 |
| 2017/0178512 | A1 * | 6/2017 | Kannon | B60Q 9/005 |
| 2019/0310636 | A1 * | 10/2019 | Halder | B60W 60/001 |
| 2019/0310654 | A1 * | 10/2019 | Halder | B60W 60/00 |
| 2020/0090504 | A1 * | 3/2020 | Kadar | G08G 1/0112 |
| 2020/0361366 | A1 | 11/2020 | Miller | |
| 2020/0398743 | A1 * | 12/2020 | Huber | B60W 30/0956 |
| 2021/0166564 | A1 * | 6/2021 | Takaki | G08G 1/166 |
| 2021/0312811 | A1 * | 10/2021 | Ohlarik | G08G 1/20 |
| 2024/0062656 | A1 * | 2/2024 | Forscher | G08G 1/163 |
| 2024/0355206 | A1 * | 10/2024 | Abdelraouf | G06V 20/597 |
| 2024/0416899 | A1 * | 12/2024 | Barrera | G06V 10/82 |
| 2024/0416949 | A1 * | 12/2024 | Barrera | B60W 30/16 |
| 2025/0033539 | A1 * | 1/2025 | Rutelin | G06F 3/153 |

* cited by examiner

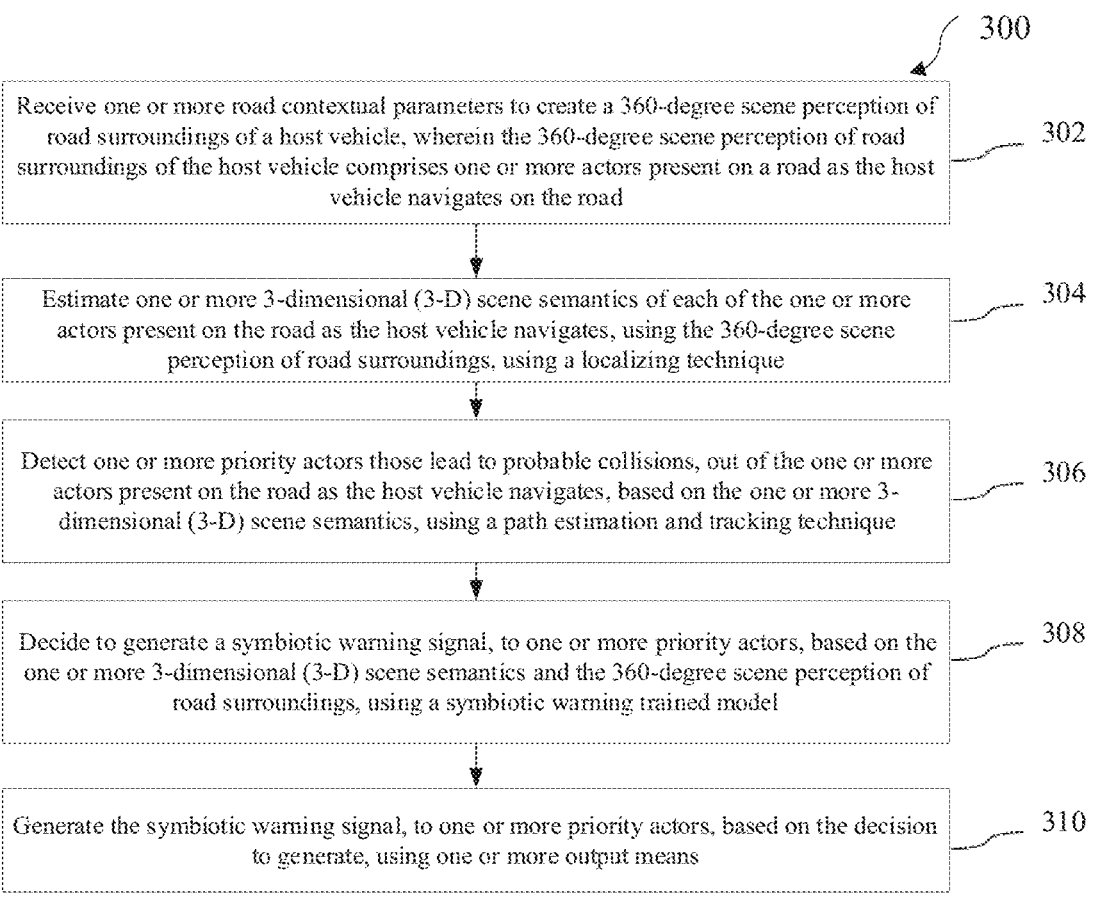

300

Receive one or more road contextual parameters to create a 360-degree scene perception of road surroundings of a host vehicle, wherein the 360-degree scene perception of road surroundings of the host vehicle comprises one or more actors present on a road as the host vehicle navigates on the road

302

Estimate one or more 3-dimensional (3-D) scene semantics of each of the one or more actors present on the road as the host vehicle navigates, using the 360-degree scene perception of road surroundings, using a localizing technique

304

Detect one or more priority actors those lead to probable collisions, out of the one or more actors present on the road as the host vehicle navigates, based on the one or more 3-dimensional (3-D) scene semantics, using a path estimation and tracking technique

306

Decide to generate a symbiotic warning signal, to one or more priority actors, based on the one or more 3-dimensional (3-D) scene semantics and the 360-degree scene perception of road surroundings, using a symbiotic warning trained model

308

Generate the symbiotic warning signal, to one or more priority actors, based on the decision to generate, using one or more output means

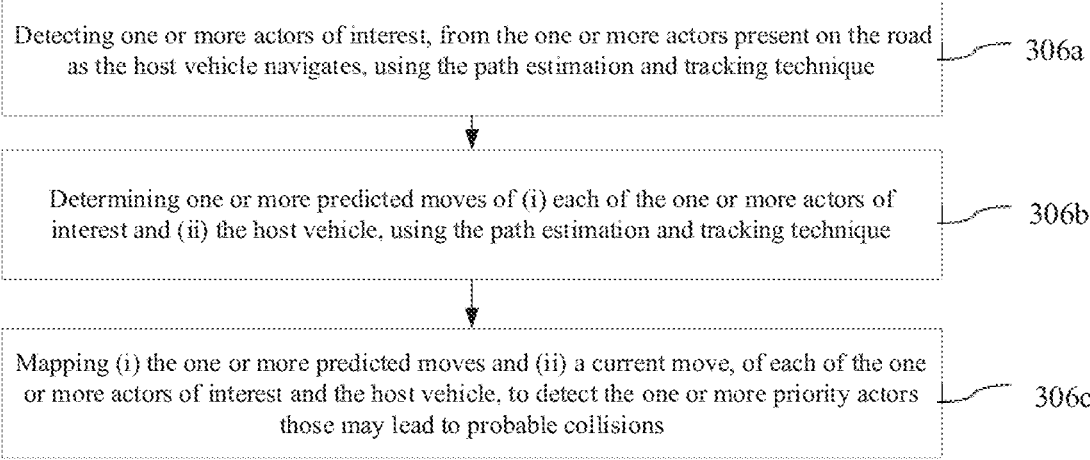

Detecting one or more actors of interest, from the one or more actors present on the road as the host vehicle navigates, using the path estimation and tracking technique          306a Determining one or more predicted moves of (i) each of the one or more actors of interest and (ii) the host vehicle, using the path estimation and tracking technique          306b Mapping (i) the one or more predicted moves and (ii) a current move, of each of the one or more actors of interest and the host vehicle, to detect the one or more priority actors those may lead to probable collisions          306c

FIG. 4

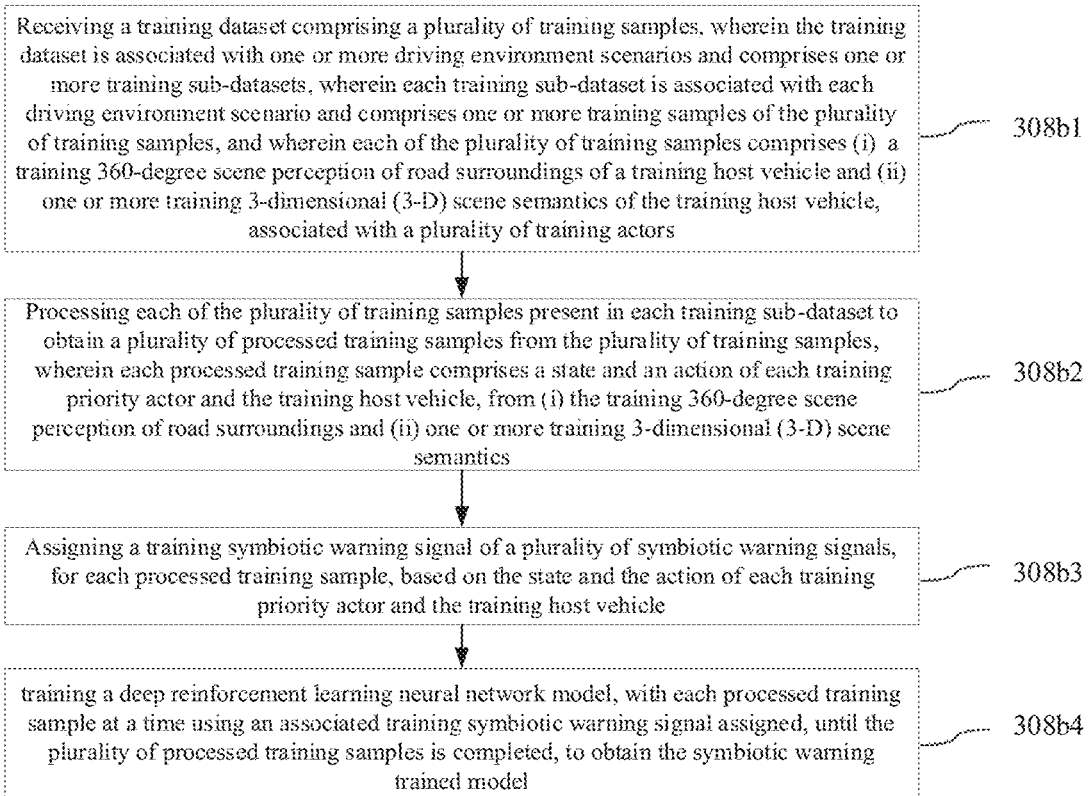

Receiving a training dataset comprising a plurality of training samples, wherein the training dataset is associated with one or more driving environment scenarios and comprises one or more training sub-datasets, wherein each training sub-dataset is associated with each driving environment scenario and comprises one or more training samples of the plurality of training samples, and wherein each of the plurality of training samples comprises (i) a training 360-degree scene perception of road surroundings of a training host vehicle and (ii) one or more training 3-dimensional (3-D) scene semantics of the training host vehicle, associated with a plurality of training actors        — 308b1

Processing each of the plurality of training samples present in each training sub-dataset to obtain a plurality of processed training samples from the plurality of training samples, wherein each processed training sample comprises a state and an action of each training priority actor and the training host vehicle, from (i) the training 360-degree scene perception of road surroundings and (ii) one or more training 3-dimensional (3-D) scene semantics        — 308b2

Assigning a training symbiotic warning signal of a plurality of symbiotic warning signals, for each processed training sample, based on the state and the action of each training priority actor and the training host vehicle        — 308b3 training a deep reinforcement learning neural network model, with each processed training sample at a time using an associated training symbiotic warning signal assigned, until the plurality of processed training samples is completed, to obtain the symbiotic warning trained model        — 308b4

FIG. 5

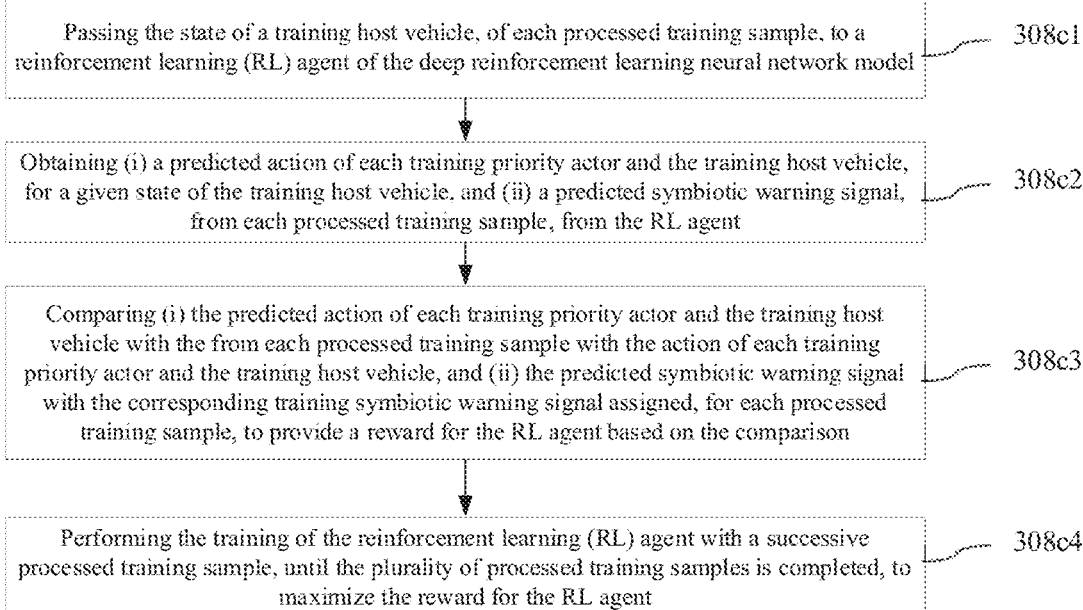

Passing the state of a training host vehicle, of each processed training sample, to a reinforcement learning (RL) agent of the deep reinforcement learning neural network model ⌐⸺ 308c1

Obtaining (i) a predicted action of each training priority actor and the training host vehicle, for a given state of the training host vehicle, and (ii) a predicted symbiotic warning signal, from each processed training sample, from the RL agent ⌐⸺ 308c2

Comparing (i) the predicted action of each training priority actor and the training host vehicle with the from each processed training sample with the action of each training priority actor and the training host vehicle, and (ii) the predicted symbiotic warning signal with the corresponding training symbiotic warning signal assigned, for each processed training sample, to provide a reward for the RL agent based on the comparison ⌐⸺ 308c3

Performing the training of the reinforcement learning (RL) agent with a successive processed training sample, until the plurality of processed training samples is completed, to maximize the reward for the RL agent ⌐⸺ 308c4

FIG. 6

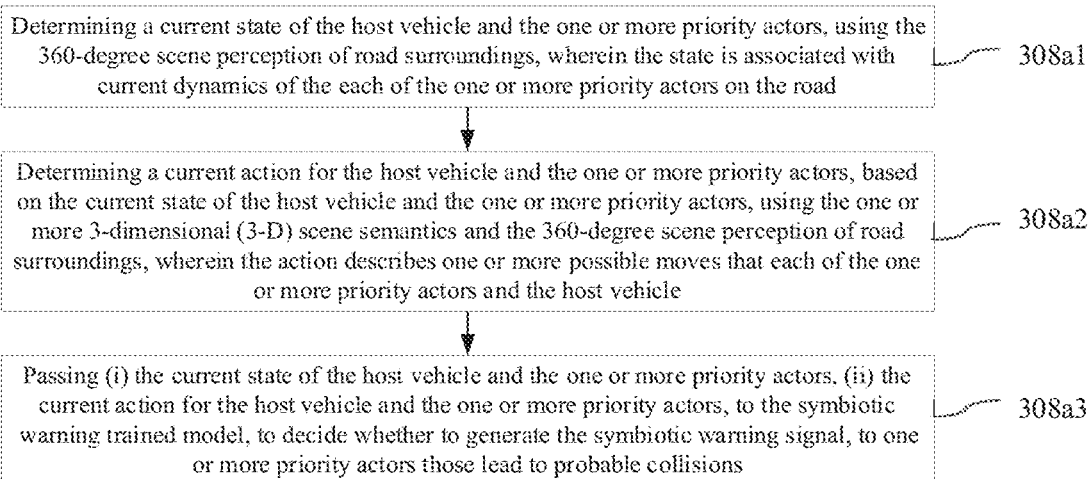

Determining a current state of the host vehicle and the one or more priority actors, using the 360-degree scene perception of road surroundings, wherein the state is associated with current dynamics of the each of the one or more priority actors on the road — 308a1

Determining a current action for the host vehicle and the one or more priority actors, based on the current state of the host vehicle and the one or more priority actors, using the one or more 3-dimensional (3-D) scene semantics and the 360-degree scene perception of road surroundings, wherein the action describes one or more possible moves that each of the one or more priority actors and the host vehicle — 308a2

Passing (i) the current state of the host vehicle and the one or more priority actors, (ii) the current action for the host vehicle and the one or more priority actors, to the symbiotic warning trained model, to decide whether to generate the symbiotic warning signal, to one or more priority actors those lead to probable collisions — 308a3

FIG. 7

SYMBIOTIC WARNING METHODS AND SYSTEMS TO WARN NEARBY TARGET ACTORS WHILE DRIVING FOR COLLISION AVOIDANCE

PRIORITY CLAIM

This U.S. patent application claims priority under 35 U.S.C. § 119 to: Indian Patent Application No. 202321057195, filed on Aug. 25, 2023. The entire contents of the aforementioned application are incorporated herein by reference.

TECHNICAL FIELD

The disclosure herein generally relates to the field of vehicle driver assistance and safety control, and more specifically to symbiotic warning methods and systems to warn nearby target actors while driving for collision avoidance.

BACKGROUND

Advanced driver-assistance systems (ADAS) are electronic systems equipped in a host vehicle that use advanced technologies to assist the driver while driving. The ADAS systems warn the driver of the host vehicle and at times takes control of the host vehicle to avoid potential collisions. However, current ADAS systems are limited to assisting the driver of the host vehicle only. Hence the current ADAS systems targets only small chunk of road accidents while leaving a behind large chunk of the accidents. This is because the actors present on the road such as other vehicles, pedestrians, or non-motorized vehicles may not be equipped with the ADAS system.

Mentioned below are certain scenarios where the current ADAS systems may fail to warn, or they get very less time to take necessary action to avoid the collisions: (a) inability of automotive sensor to detect nearby targets (other vehicles including non-motorized vehicles and pedestrians) due to occluded environment, (b) sudden appearance of the targets (other vehicles including non-motorized vehicles and pedestrians) near to the host vehicle, and (c) inattentive driving from the driver of the target vehicle (other vehicles including non-motorized vehicles).

SUMMARY

Embodiments of the present disclosure present technological improvements as solutions to one or more of the above-mentioned technical problems recognized by the inventors in conventional systems.

In an aspect, a processor-implemented method for generating a cause-effect sentiment-enriched knowledge graph for portfolio optimization is provided. The method including the steps of: receiving one or more road contextual parameters to create a 360-degree scene perception of road surroundings of a host vehicle, wherein the 360-degree scene perception of road surroundings of the host vehicle comprises one or more actors present on a road as the host vehicle navigates on the road; estimating one or more 3-dimensional (3-D) scene semantics of each of the one or more actors present on the road as the host vehicle navigates, using the 360-degree scene perception of road surroundings, using a localizing technique; detecting, one or more priority actors those lead to probable collisions, out of the one or more actors present on the road as the host vehicle navigates, based on the one or more 3-dimensional (3-D) scene semantics, using a path estimation and tracking technique; deciding to generate a symbiotic warning signal, to one or more priority actors, based on the one or more 3-dimensional (3-D) scene semantics and the 360-degree scene perception of road surroundings, using a symbiotic warning trained model; and generating the symbiotic warning signal, to one or more priority actors, based on the decision to generate, using one or more output means.

In another aspect, a system for generating a cause-effect sentiment-enriched knowledge graph for portfolio optimization is provided. The system includes: a memory storing instructions; one or more Input/Output (I/O) interfaces; and one or more hardware processors coupled to the memory via the one or more I/O interfaces, wherein the one or more hardware processors are configured by the instructions to: receive one or more road contextual parameters to create a 360-degree scene perception of road surroundings of a host vehicle, wherein the 360-degree scene perception of road surroundings of the host vehicle comprises one or more actors present on a road as the host vehicle navigates on the road; estimate one or more 3-dimensional (3-D) scene semantics of each of the one or more actors present on the road as the host vehicle navigates, using the 360-degree scene perception of road surroundings, using a localizing technique; detect one or more priority actors those lead to probable collisions, out of the one or more actors present on the road as the host vehicle navigates, based on the one or more 3-dimensional (3-D) scene semantics, using a path estimation and tracking technique; decide to generate a symbiotic warning signal, to one or more priority actors, based on the one or more 3-dimensional (3-D) scene semantics and the 360-degree scene perception of road surroundings, using a symbiotic warning trained model; and generate the symbiotic warning signal, to one or more priority actors, based on the decision to generate, using one or more output means.

In yet another aspect, there are provided one or more non-transitory machine-readable information storage mediums comprising one or more instructions which when executed by one or more hardware processors cause: receiving one or more road contextual parameters to create a 360-degree scene perception of road surroundings of a host vehicle, wherein the 360-degree scene perception of road surroundings of the host vehicle comprises one or more actors present on a road as the host vehicle navigates on the road; estimating one or more 3-dimensional (3-D) scene semantics of each of the one or more actors present on the road as the host vehicle navigates, using the 360-degree scene perception of road surroundings, using a localizing technique; detect one or more priority actors those lead to probable collisions, out of the one or more actors present on the road as the host vehicle navigates, based on the one or more 3-dimensional (3-D) scene semantics, using a path estimation and tracking technique; deciding to generate a symbiotic warning signal, to one or more priority actors, based on the one or more 3-dimensional (3-D) scene semantics and the 360-degree scene perception of road surroundings, using a symbiotic warning trained model; and generating the symbiotic warning signal, to one or more priority actors, based on the decision to generate, using one or more output means.

In an embodiment, detecting one or more priority actors those lead to probable collisions, out of the one or more actors present on the road as the host vehicle navigates, based on the one or more 3-dimensional (3-D) scene semantics, using a path estimation and tracking technique, comprises: detecting one or more actors of interest, from the one or more actors present on the road as the host vehicle navigates, using the path estimation and tracking technique; determining one or more predicted moves of (i) each of the one or more actors of interest and (ii) the host vehicle, using the path estimation and tracking technique; and mapping (i) the one or more predicted moves and (ii) a current move, of each of the one or more actors of interest and the host vehicle, to detect the one or more priority actors those may lead to probable collisions.

In an embodiment, deciding to generate the symbiotic warning signal of the one or more symbiotic warning signals, to one or more priority actors based on the one or more 3-dimensional (3-D) scene semantics and the 360-degree scene perception of road surroundings, using the symbiotic warning trained model, comprising: determining a current state of the host vehicle and the one or more priority actors, using the 360-degree scene perception of road surroundings, wherein the state is associated with current dynamics of the each of the one or more priority actors on the road; determining a current action for the host vehicle and the one or more priority actors, based on the current state of the host vehicle and the one or more priority actors, using the one or more 3-dimensional (3-D) scene semantics and the 360-degree scene perception of road surroundings, wherein the action describes one or more possible moves that each of the one or more priority actors and the host vehicle; and passing (i) the current state of the host vehicle and the one or more priority actors, (ii) the current action for the host vehicle and the one or more priority actors, to the symbiotic warning trained model, to decide whether to generate the symbiotic warning signal, to one or more priority actors those lead to probable collisions.

In an embodiment, the symbiotic warning trained model is obtained by: receiving a training dataset comprising a plurality of training samples, wherein the training dataset is associated with one or more driving environment scenarios and comprises one or more training sub-datasets, wherein each training sub-dataset is associated with each driving environment scenario and comprises one or more training samples of the plurality of training samples, and wherein each of the plurality of training samples comprises (i) a training 360-degree scene perception of road surroundings of a training host vehicle and (ii) one or more training 3-dimensional (3-D) scene semantics of the training host vehicle, associated with a plurality of training actors; processing each of the plurality of training samples present in each training sub-dataset to obtain a plurality of processed training samples from the plurality of training samples, wherein each processed training sample comprises a state and an action of each training priority actor and the training host vehicle, from (i) the training 360-degree scene perception of road surroundings and (ii) one or more training 3-dimensional (3-D) scene semantics; assigning a training symbiotic warning signal of a plurality of symbiotic warning signals, for each processed training sample, based on the state and the action of each training priority actor and the training host vehicle; and training a deep reinforcement learning neural network model, with each processed training sample at a time using an associated training symbiotic warning signal assigned, until the plurality of processed training samples is completed, to obtain the symbiotic warning trained model.

In an embodiment, training the deep reinforcement learning neural network model, with each processed training sample at a time using the associated training symbiotic warning signal assigned, until the plurality of processed training samples is completed, to obtain the symbiotic warning trained model, comprises: passing the state of a training host vehicle, of each processed training sample, to a reinforcement learning (RL) agent of the deep reinforcement learning neural network model; obtaining (i) a predicted action of each training priority actor and the training host vehicle, for a given state of the training host vehicle, and (ii) a predicted symbiotic warning signal, from each processed training sample, from the RL agent; comparing (i) the predicted action of each training priority actor and the training host vehicle with the from each processed training sample with the action of each training priority actor and the training host vehicle, and (ii) the predicted symbiotic warning signal with the corresponding training symbiotic warning signal assigned, for each processed training sample, to provide a reward for the RL agent based on the comparison; and performing the training of the reinforcement learning (RL) agent with a successive processed training sample, until the plurality of processed training samples is completed, to maximize the reward for the RL agent.

In an embodiment, the one or more actors present on the road comprises one or more motorized and non-motorized vehicles, pedestrians, and animals present on the road surrounding the host vehicle.

In an embodiment, wherein the symbiotic warning signal is generated through horn, headlights, a vehicle-vehicle to communication, and a combination thereof, based on type of the priority actor and a driving environment scenario.

In an embodiment, the one or more road contextual parameters are associated with a road modelling and the one or more road contextual parameters are received from one or more of: one or more 360-degree Lidars, one or more front corner radars, one or more rear corner radars, one or more cameras, one or more ultrasonic sensors, and one or more geographical road information devices, or a combination thereof, installed in the host vehicle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 illustrates an exemplary flow diagram of a processor-implemented symbiotic warning method to warn nearby target actors while driving for collision avoidance, in accordance with some embodiments of the present disclosure.

FIG. 4 illustrates an exemplary flow diagram for detecting one or more priority actors those lead to probable collisions, out of the one or more actors present on the road as the host vehicle navigates, based on the one or more 3-dimensional (3-D) scene semantics, using a path estimation and tracking technique, in accordance with some embodiments of the present disclosure.

5

6

Figure 1:
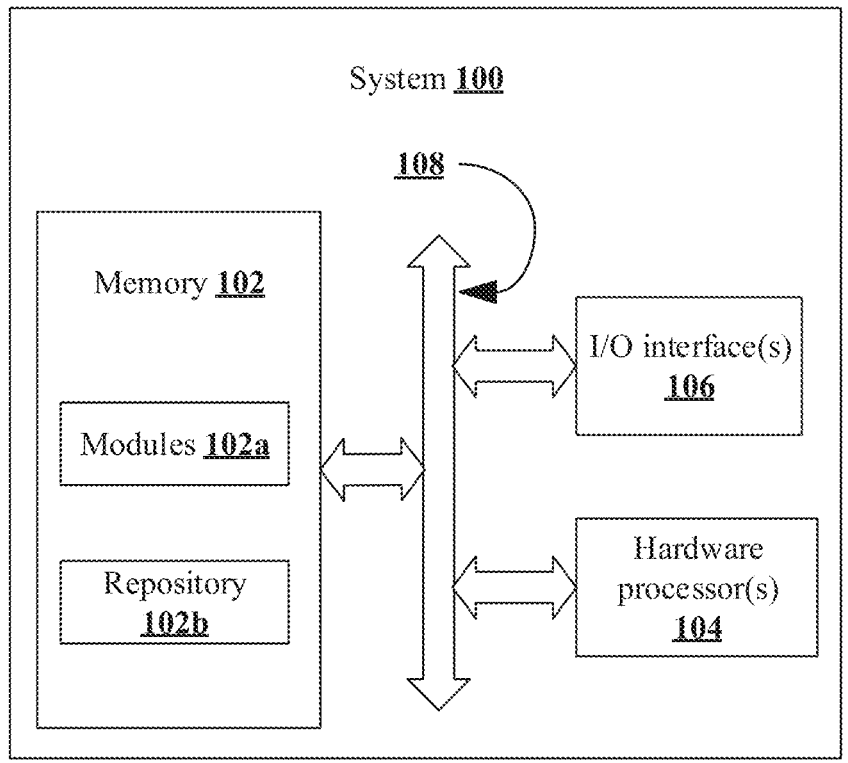
FIG. 1 is an exemplary block diagram of a symbiotic warning system to warn nearby target actors while driving for collision avoidance, in accordance with some embodiments of the present disclosure.

FIG. 5 illustrates an exemplary flow diagram for obtaining a symbiotic warning trained model, in accordance with some embodiments of the present disclosure.

FIG. 6 illustrates an exemplary flow diagram for training a deep reinforcement learning neural network model, with each processed training sample at time using the corresponding training symbiotic warning signal assigned, until the plurality of symbiotic warning signals is completed, to obtain the symbiotic warning trained model, in accordance with some embodiments of the present disclosure.

FIG. 7 illustrates an exemplary flow diagram for deciding to generate the symbiotic warning signal of the one or more symbiotic warning signals, to one or more priority actors those lead to probable collisions based on the one or more 3-dimensional (3-D) scene semantics and the 360-degree scene perception of road surroundings, using the symbiotic warning trained model, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Current ADAS systems are limited to assisting only the driver of the host vehicle in potential dangers. Hence, the current ADAS systems are not effectively averting accidents or providing assistance in certain scenarios. This is because the actors present on the road such as other vehicles, pedestrians or non-motorized vehicles may not be equipped with the ADAS system.

Below are some of the scenarios where the current ADAS systems may fail to warn, or they get very less time to take necessary action to avoid the collisions: (a) inability of automotive sensor to detect nearby targets (other vehicles including non-motorized vehicles and pedestrians) due to occluded environment, (b) sudden appearance of the targets (other vehicles including non-motorized vehicles and pedestrians) near to the host vehicle, and (c) inattentive driving from the driver of the target vehicle (other vehicles including non-motorized vehicles).

The present disclosure solves the technical problems in the art with the symbiotic warning methods and systems installed in the host vehicle, to identify such scenarios and gives necessary warning to the target vehicles, pedestrians, and animals around the host vehicle. The conventional ADAS system issues warning to alert driver of the host vehicle whereas the present symbiotic warning methods and systems warn nearby target vehicles, pedestrians, and animals automatically by taking control of host vehicle communication devices such as a horn, a headlight flash or communicate with a dedicated short-range communication (DSRC) technology.

Referring now to the drawings, and more particularly to FIG. 1 through FIG. 7, where similar reference characters denote corresponding features consistently throughout the figures, there are shown preferred embodiments, and these embodiments are described in the context of the following exemplary systems and/or methods.

FIG. 1 is an exemplary block diagram of a symbiotic warning system 100 to warn nearby target actors while driving for collision avoidance, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102*a* and a repository 102*b* for storing data processed, received, and generated by one or more of the plurality of modules 102*a*. The plurality of modules 102*a* may include routines, programs, objects, components, data structures, and so on, which perform particular tasks or implement particular abstract data types.

The plurality of modules 102*a* may include programs or computer-readable instructions or coded instructions that supplement applications or functions performed by the system 100. The plurality of modules 102*a* may also be used as, signal processor(s), state machine(s), logic circuitries, and/ or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2:
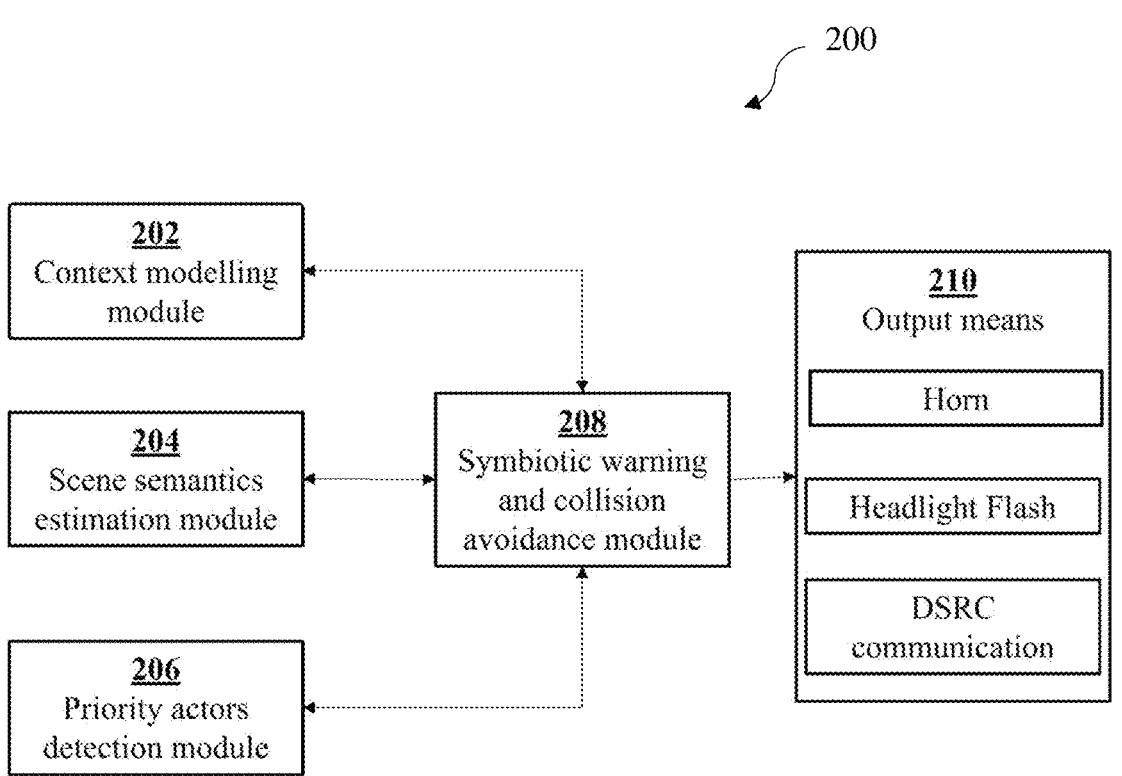
FIG. 2 is an exemplary block diagram illustrating modules of the symbiotic warning system of FIG. 1, to warn nearby target actors while driving for collision avoidance, in accordance with some embodiments of the present disclosure.

Referring collectively to FIG. 2 and FIG. 3, components and functionalities of the system 100 are described in accordance with an example embodiment of the present disclosure. For example, FIG. 2 is an exemplary block diagram illustrating modules 200 of the symbiotic warning system 100 of FIG. 1, to warn nearby target actors while driving for collision avoidance, in accordance with some embodiments of the present disclosure. In an embodiment, the symbiotic warning system 100 is installed or equipped in the host vehicle.

As shown in FIG. 2, the modules 200 include a context modelling module 202, a scene semantics estimation module 204, a priority actors detection module 206, a symbiotic warning and collision avoidance module 208, and an output means 210. In an embodiment, the modules 200 are stored in the repository 102b of the system 100.

In an embodiment, the context modelling module 202 is configured to receive one or more road contextual parameters to create a 360-degree scene perception of road surroundings of the host vehicle. The 360-degree scene perception of the road surroundings of the host vehicle includes one or more actors present on a road within a specific range, a proximity, or a distance to the host vehicle as the host vehicle navigates on the road. In an embodiment, the one or more actors present on the road includes but are not limited to one or more motorized vehicles, one or more non-motorized vehicles, pedestrians, and animals present on the road surrounding the host vehicle.

In an embodiment, the one or more road contextual parameters are related to the parameters of the road surroundings as the host vehicle travels on the road approaching towards the one or more actors. In an embodiment, the one or more road contextual parameters are received from one or more of: one or more 360-degree light detection and ranging (Lidars), one or more front corner radars, one or more rear corner radio detection and ranging (radars), one or more cameras, one or more ultrasonic sensors, and one or more geographical road information devices, or a combination of the above thereof, that are installed or equipped in the host vehicle.

In an embodiment, the 360-degree scene perception of road surroundings of the host vehicle, typically include one or more images and/or one or more sensor values, or a combination there of, that are generated using the one or more road contextual parameters associated with the road surroundings of the host vehicle as it moves on.

The scene semantics estimation module 204 is configured to estimate one or more 3-dimensional (3-D) scene semantics of each of the one or more actors present on the road as the host vehicle navigates. The 360-degree scene perception of road surroundings of the host vehicle is analyzed using a localization technique to estimate the one or more 3-dimensional (3-D) scene semantics of each of the one or more actors present on the road as the host vehicle navigates.

In an embodiment, the one or more 3-dimensional (3-D) scene semantics includes but are not limited to: a number of the one or more motorized vehicles, a current distance between the host vehicle and each of the one or more motorized vehicles, an acceleration of each of the one or more motorized vehicles, dimensions and dynamics of each of the one or more motorized vehicles, a current moving direction of each of the one or more motorized vehicles, the number of the one or more non-motorized vehicles, the current distance between the host vehicle and each of the one or more non-motorized vehicles, the acceleration of each of the one or more non-motorized vehicles, the dimensions and the dynamics of each of the one or more non-motorized vehicles, the current moving direction of each of the one or more non-motorized vehicles, the number of the one or more pedestrians, the current distance between the host vehicle and each of the one or more pedestrians, the current moving direction of each of the one or more pedestrians, the number of the one or more animals, the current distance between the host vehicle and each of the one or more animals, and the current moving direction of each of the one or more animals.

In an embodiment, the priority actors detection module 206 is configured to detect one or more priority actors, out of the one or more actors present on the road as the host vehicle navigates. The one or more priority actors are the actors that may lead to probable collisions with the host vehicle as they navigate on the road. The one or more priority actors are detected using the one or more 3-dimensional (3-D) scene semantics estimated by the scene semantics estimation module 204. In an embodiment, the priority actors detection module 206 utilizes a path estimation and tracking technique in order to detect the one or more priority actors those lead to probable collisions.

In an embodiment, the symbiotic warning and collision avoidance module 208 is configured to continuously decide when to generate a symbiotic warning signal, and to which of the one or more priority actors the symbiotic warning is to be provided. The symbiotic warning and collision avoidance module 208 employs a symbiotic warning trained model to decide when to generate a symbiotic warning signal, and to which of the one or more priority actors the symbiotic warning is to be provided, based on the 360-degree scene perception of road surroundings created by the context modelling module 202 and the one or more 3-dimensional (3-D) scene semantics estimated by the scene semantics estimation module 204.

In various embodiments, the symbiotic warning signal is generated through horn, headlights, a vehicle-vehicle to communication, and a combination thereof, equipped in the host vehicle, based on type of a priority actor and a driving environment scenario. For example, if the host vehicle is a car and the surrounding environment is in day light, then the symbiotic warning signal generated may be by sounding horn. Similarly, if the host vehicle is the car and the surrounding environment is at night (dark environment), then the symbiotic warning signal generated may be by flashing the headlights. Similarly, when the host vehicle is a similar vehicle as that of the host vehicle and if both are having the vehicle-vehicle to communication, then the symbiotic warning signal is in the form of vehicle-vehicle to communication.

In an embodiment, the output means 210 includes one or more symbiotic warning signal means such as the horn, the headlights, the vehicle-vehicle to communication equipped in the host vehicle. The output means 210 is configured to receive the instructions decided by the symbiotic warning and collision avoidance module 208 and generates the symbiotic warning signal, to the one or more priority actors, based on the decision by the symbiotic warning and collision avoidance module 208, through one or more output means (symbiotic warning signal means).

Referring to FIG. 3, components and functionalities of the system 100 are described in accordance with an example embodiment of the present disclosure. For example, FIG. 3 illustrates an exemplary flow diagram of a processor-implemented symbiotic warning method 300 to warn nearby target actors while driving for collision avoidance, in accordance with some embodiments of the present disclosure. Although steps of the method 300 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to receive the one or more road contextual parameters thorough the context modelling module 202 to create the 360-degree scene perception of road surroundings of the host vehicle. The one or more road contextual parameters are related to the parameters of the road surroundings as the host vehicle travels on the road approaching towards the one or more actors.

In an embodiment, the one or more road contextual parameters are received from one or more of: one or more 360-degree light detection and ranging (Lidars), one or more front corner radars, one or more rear corner radio detection and ranging (radars), one or more cameras, one or more ultrasonic sensors, and one or more geographical road information devices, or a combination of the above thereof, that are installed or equipped in the host vehicle.

In an embodiment, the 360-degree scene perception of road surroundings of the host vehicle, gives a visual representation of surroundings of the host vehicle (helps the see the world around itself), and allows the host vehicle to recognize and classify the one or more actors (things) in the surroundings during the navigation of the host vehicle. Apart from the one or more actors, the host vehicle needs to see and classify traffic lights, pedestrians, road signs, walkways, parking spots, lanes, and much more. Further, the host vehicle also needs to know the exact distance between itself and the things around it.

In an embodiment, the 360-degree scene perception of road surroundings of the host vehicle typically includes one or more images, one or more sensor values, or a combination there of, that are generated using the one or more road contextual parameters are associated with the road surroundings of the host vehicle as it moves on.

In an embodiment, one or more image processing techniques may be employed to create the 360-degree scene perception of road surroundings of the host vehicle from the one or more road contextual parameters. In an embodiment, one or more image processing techniques include but are not limited to OmniDet and SurroundNet. Further a deep learning-based object detection model may be employed to recognize the one or more actors present on the road from the created 360-degree scene perception of road surroundings. In an embodiment, some of the deep learning-based object detection model include but are not limited to a region-based convolutional neural network (R-CNN) and point cloud based networks).

At step 304 of the method 300, the one or more hardware processors 104 of the system 100 are configured to estimate the one or more 3-dimensional (3-D) scene semantics of each of the one or more actors present on the road as the host vehicle navigates, using the 360-degree scene perception of road surroundings, through the scene semantics estimation module 204. As described, the localizing technique is employed by the scene semantics estimation module 204 to estimate the one or more 3-dimensional (3-D) scene semantics of each of the one or more actors.

In an embodiment, the one or more 3-dimensional (3-D) scene semantics includes but are not limited to: the number of the one or more motorized vehicles, the current distance between the host vehicle and each of the one or more motorized vehicles, the acceleration of each of the one or more motorized vehicles, dimensions and dynamics of each of the one or more motorized vehicles, the current moving direction of each of the one or more motorized vehicles, the number of the one or more non-motorized vehicles, the current distance between the host vehicle and each of the one or more non-motorized vehicles, the acceleration of each of the one or more non-motorized vehicles, the dimensions and the dynamics of each of the one or more non-motorized vehicles, the current moving direction of each of the one or more non-motorized vehicles, the number of the one or more pedestrians, the current distance between the host vehicle and each of the one or more pedestrians, the current moving direction of each of the one or more pedestrians, the number of the one or more animals, the current distance between the host vehicle and each of the one or more animals, and the current moving direction of each of the one or more animals.

In an embodiment, the localizing technique includes one or more localization algorithms that calculate a position and an orientation of the host vehicle with respect to the position of the one or more actors in the road surroundings. In an embodiment, a visual odometry (VO) algorithm is employed which works by matching key points in consecutive video frames, wherein the key points are the position and the orientation. With each frame, the key points are used as the input to a mapping algorithm. The mapping algorithm, such as simultaneous localization and mapping (SLAM), computes the position and orientation of each actor in a current frame with respect to the previous frame and helps to classify all the actors on the road.

In an embodiment, a deep learning may be generally used to improve the performance of VO algorithm, and to classify different actors. Neural networks, such as PoseNet and VLocNet++, are some of the frameworks that use point data to estimate the 3-D position and orientation. These estimated 3-D positions and orientations can be used to derive the one or more 3-dimensional (3-D) scene semantics.

At step 306 of the method 300, the one or more hardware processors 104 of the system 100 are configured to detect one or more priority actors those may lead to probable collisions, out of the one or more actors present on the road as the host vehicle navigates, through the priority actors detection module 206. The one or more priority actors are detected using the one or more 3-dimensional (3-D) scene semantics estimated at the step 304 of the method 300. In an embodiment, the priority actors detection module 206 utilizes the path estimation and tracking technique in order to detect the one or more priority actors.

FIG. 4 illustrates an exemplary flow diagram for detecting the one or more priority actors, out of the one or more actors present on the road as the host vehicle navigates, based on the one or more 3-dimensional (3-D) scene semantics, using the path estimation and tracking technique, in accordance with some embodiments of the present disclosure. As shown in FIG. 4, detecting the one or more priority actors those lead to probable collisions, out of the one or more actors, is explained through steps 306a through 306c.

At step 306a, one or more actors of interest, are detected from the one or more actors present on the road as the host vehicle navigates, using the path estimation and tracking technique. At step 306b, one or more predicted moves of (i) each of the one or more actors of interest with respect to the host vehicle by its moves, are determined using the path estimation and tracking technique. In an embodiment, some of the path estimation and tracking techniques include but are not limited to Pure Pursuit algorithm and a Kalman filter. Finally, at step 306c, (i) the one or more predicted moves and (ii) a current move, of each of the one or more actors of interest and the host vehicle, are mapped to detect the one or more priority actors those lead to probable collisions. The current move is the present or current movement in a real-time.

The priority actor's detection module 206 detects the one or more priority actors which would be affected by probable collisions with the host vehicle. These one or more priority actors can be vehicle in blind spot or in occluded area, lane changing vehicles, non-motorized vehicles, pedestrians etc. Further, the priority actors detection module 206 calculates a Time-To-Collision (TTC) which is a distance between each actor and the host vehicle divided by their relative speed. The Time-To-Collision (TTC) is further used for warning computation. In an embodiment, the priority actors detection module 206 processes output from other existing ADAS systems like Adaptive Cruise Control, Emergency braking system, Blind spot warning, Rear/Front cross traffic alert, Lateral collision warning etc. This ensures that the reuse of the existing algorithms and avoids the repetition.

At step 308 of the method 300, the one or more hardware processors 104 of the system 100 are configured to continuously decide when to generate a symbiotic warning signal, and to which of the one or more priority actors those lead to probable collisions with the host vehicle, through the symbiotic warning and collision avoidance module 208.

The symbiotic warning and collision avoidance module 208 employs the symbiotic warning trained model to decide when to generate the symbiotic warning signal, to which of the one or more priority actors those lead to probable collisions with the host vehicle, based on the 360-degree scene perception of road surroundings created by the context modelling module 202 and the one or more 3-dimensional (3-D) scene semantics estimated by the scene semantics estimation module 204.

In various embodiments, the symbiotic warning signal is generated through horn, headlights, a vehicle-vehicle to communication, and a combination thereof, equipped in the host vehicle, based on type of a priority actor and a driving environment scenario. For example, if the host vehicle is a car and the surrounding environment is in day light, then the symbiotic warning signal generated may be by sounding horn. Similarly, if the host vehicle is the car and the surrounding environment is at night (dark environment), then the symbiotic warning signal generated may be by flashing the headlights. Similarly, when the host vehicle is a similar vehicle as that of the host vehicle and if both are having the vehicle-vehicle to communication, then the symbiotic warning signal is in the form of vehicle-vehicle to communication.

FIG. 5 illustrates an exemplary flow diagram for obtaining the symbiotic warning trained model, in accordance with some embodiments of the present disclosure. As shown in FIG. 5, obtaining the symbiotic warning trained model is explained through steps 308b1 through 308b4. At step 308b1, a training dataset comprising a plurality of training samples is received. The training dataset is associated with one or more driving environment scenarios. The training dataset includes one or more training sub-datasets, wherein each training sub-dataset is associated with each driving environment scenario.

In an embodiment, the one or more driving environment scenarios include but are not limited to (i) cut in lane driving, (ii) driving through a hair pin bend road on a hill side, (iii) an abnormal/un-intentional lane change by the priority actors while host vehicle in a blind spot, (iv) overtaking the host vehicle in a narrow lane, (v) a sudden close appearance of pedestrian/animal/other vehicle on road, (vi) merging lane and T Junction situations, and (vii) vehicle backing up.

In an embodiment, each training sub-dataset comprises one or more training samples corresponding to the driving environment scenario. Each training sample comprises (i) a training 360-degree scene perception of road surroundings of a training host vehicle, and (ii) one or more training 3-dimensional (3-D) scene semantics of the training host vehicle, associated with a plurality of training actors.

At step 308b2, each training sample present in each training sub-dataset is processed to obtain a plurality of processed training samples from the plurality of training samples. Each processed training sample comprises a state and an action of each training priority actor and the training host vehicle, defined from (i) the training 360-degree scene perception of road surroundings and (ii) one or more training 3-dimensional (3-D) scene semantics. In an embodiment, the state and the action of each training priority actor and the training host vehicle corresponding to one of the one or more driving environment scenarios.

At step 308b3, a training symbiotic warning signal of the plurality of symbiotic warning signals, is assigned for each processed training sample, based on the state and the action of each training priority actor and the training host vehicle. In an embodiment, the plurality of symbiotic warning signals is generated through the horn, the headlights, the vehicle-vehicle to communication, and the combination thereof, based on type of the priority actor and the driving environment scenario.

Table 1 shows an exemplary processed training sample present in each training sub-dataset associated with different driving scenarios with their exemplary states. In Table 1, the state is defined in terms of their corresponding speeds.

TABLE 1

| Scenario | Dataset |
|---|---|
| Driving through hair pin bend road on hill side - Steep turn encountered which resulted in near miss with oncoming two wheelers | 1. Host vehicle (HV) speed = 40, 50, 60, 80 kmph with No target vehicle present<br>2. HV speed = 40, 50, 60, 80 kmph and oncoming Target vehicle (TV) speed at 10, 20, 40, 60, 80 kmph<br>3. Repeat the dataset with target vehicle as car, truck, and motorcycle.<br>4. Repeat the above dataset with different road curvature e.g. <125 m and >125 m |
| Cut-In lane scenarios - Target and host vehicle in right lane suddenly cut on to host lane resulting in near miss rear ending | 1. HV speed = 40, 60, 80, 100 kmph and cut-in TV speed = 60, 80, 100, 120 kmph |
| Merging scenarios - Target and host vehicle merging on T-junction and merging lane | 1. HV speed = 40, 60, 80, 100 kmph and target is merging with TV speed = 40, 60, 80, 100 kmph<br>2. HV speed = 40, 60, 80, 100 kmph and target is merging from T-junction with TV speed = 10, 20, 40 kmph |
| Target host vehicle in ego lane applied sudden brake due to which there was near collision | 1. HV speed = 40, 60, 80, 100 kmph and TV speed = 20 kmph at 350 m in ego lane<br>2. HV speed = 40, 60, 80, 100 kmph and TV speed = 50 kmph at 250 m in ego lane<br>3. HV speed = 40, 60, 80, 100 kmph and slow-moving target or stationary target at 100 m in ego lane |

At step 308b4, a deep reinforcement learning neural network model is trained with each processed training sample at time using the corresponding training symbiotic warning signal assigned obtained at step 308b2 and at step 308b3 respectively. The training process is iterated until the plurality of processed training samples is completed, to obtain the symbiotic warning trained model. In an embodiment, the deep reinforcement learning neural network model is one from a list including but is not limited to Q-learning, and a Markov decision process (MDP).

FIG. 6 illustrates an exemplary flow diagram for training the deep reinforcement learning neural network model, with each processed training sample at time using the corresponding training symbiotic warning signal assigned, until the plurality of processed training samples is completed, to obtain the symbiotic warning trained model, in accordance with some embodiments of the present disclosure. As shown in FIG. 6, training the deep reinforcement learning neural network model to obtain the symbiotic warning trained model, is explained through steps 308c1 through 308c4.

At step 308c1, the state of a training host vehicle, in each processed training sample is passed to a reinforcement learning (RL) agent of the deep reinforcement learning neural network model. At step 308c2, (i) a predicted action of each training priority actor and the training host vehicle, for a given state of the training host vehicle, and (ii) a predicted symbiotic warning signal, from each processed training sample, are obtained from the RL agent.

At step 308c3, (i) the predicted action of each training priority actor and the training host vehicle with the from each processed training sample with the action of each training priority actor and the training host vehicle, and (ii) the predicted symbiotic warning signal with the corresponding training symbiotic warning signal assigned, for each processed training sample, are compared to provide a reward for the RL agent based on the comparison. At step 308c4, the training of the reinforcement learning (RL) agent with a successive processed training sample, is performed until the plurality of processed training samples is completed, to maximize the reward for the RL agent and to obtain the symbiotic warning trained model.

FIG. 7 illustrates an exemplary flow diagram for deciding to generate the symbiotic warning signal of the one or more symbiotic warning signals, to one or more priority actors based on the one or more 3-dimensional (3-D) scene semantics and the 360-degree scene perception of road surroundings, using the symbiotic warning trained model, in accordance with some embodiments of the present disclosure. As shown in FIG. 7, deciding to generate the symbiotic warning signal of the one or more symbiotic warning signals, to one or more priority actors is explained through steps 308a1 through 308a3.

At step 308a1, a current state of the host vehicle and the one or more priority actors, is determined, using the 360-degree scene perception of road surroundings created at step 302 of the method 300. In an embodiment, the state is associated with current dynamics of the each of the one or more priority actors on the road. At 308a2, a current action for the host vehicle and the one or more priority actors, is determined based on the current state of the host vehicle and the one or more priority actors determined at step 308a1, using the one or more 3-dimensional (3-D) scene semantics estimated at step 304 of the method 300 and the 360-degree scene perception of road surroundings created at step 302 of the method 300. In an embodiment, the action describes one or more possible moves that each of the one or more priority actors and the host vehicle.

At step 308a3, (i) the current state of the host vehicle and the one or more priority actors, (ii) the current action for the host vehicle and the one or more priority actors, determined at step 308a1 and 308a2 respectively, are passed to the symbiotic warning trained model, to decide whether to generate the symbiotic warning signal, to one or more priority actors those lead to probable collisions. When the current state of the host vehicle and the one or more priority actors the current action for the host vehicle and the one or more priority actors are associated with one of the driving scenarios and the corresponding symbiotic warning signal is generated to alert the one or more priority actors.

At step 310 of the method 300, the one or more hardware processors 104 of the system 100 are configured to generate the symbiotic warning signal, to one or more priority actors those lead to probable collisions, based on the decision to generate, using the one or more output means, through the output means 210. In an embodiment, the output means 210 includes one or more symbiotic warning signal means such as the horn, the headlights, the vehicle-vehicle to communication equipped in the host vehicle. The output means 210 is configured to receive the instructions decided by the symbiotic warning and collision avoidance module 208 and generates the symbiotic warning signal, to one or more priority actors those lead to probable collisions, based on the decision by the symbiotic warning and collision avoidance module 208, through one or more output means (symbiotic warning signal means).

The method and systems of the present disclosure warns nearby target vehicles, pedestrians, and animals automatically by taking control of host vehicle communication devices such as a horn, a headlight flash or communicate with a dedicated short-range communication (DSRC) technology. The symbiotic warning methods and systems are installed in the host vehicle, to identify such scenarios and gives necessary warning to the target vehicles, pedestrians, and animals around the host vehicle.

The symbiotic warning systems of the present disclosure may be implemented on top of the current ADAS systems, so that a separate hardware is not required and reduces the cost. Methods and systems of the present disclosure are useful to warn the targets in very quick time so that many roads fatal accidents may be avoided.

The embodiments of the present disclosure herein address unresolved problems of alerting the target actors on road by the host vehicle. The symbiotic warning methods and systems of the present disclosure warns nearby target vehicles, pedestrians, and animals automatically by taking control of host vehicle communication devices such as the horn, the headlight flash or communicate with the dedicated short-range communication (DSRC) technology.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising the steps of:

receiving, via one or more hardware processors, one or more road contextual parameters to create a 360-degree scene perception of road surroundings of a host vehicle, wherein the 360-degree scene perception of road surroundings of the host vehicle comprises one or more actors present on a road as the host vehicle navigates on the road, wherein the 360-degree scene perception of the road surroundings of the host vehicle include one or more images and one or more sensor values;

estimating, via the one or more hardware processors, one or more 3-dimensional (3-D) scene semantics of each of the one or more actors present on the road as the host vehicle navigates, using the 360-degree scene perception of road surroundings, using a localizing technique;

detecting, via the one or more hardware processors, one or more priority actors those lead to probable collisions with the host vehicle, out of the one or more actors present on the road as the host vehicle navigates, based on the one or more 3-dimensional (3-D) scene semantics, using a path estimation and tracking technique;

deciding, via the one or more hardware processors, to generate a symbiotic warning signal, to one or more priority actors, based on the one or more 3-dimensional (3-D) scene semantics and the 360-degree scene perception of road surroundings, using a symbiotic warning trained model, wherein the symbiotic warning trained model is obtained by:

receiving a training dataset comprising a plurality of training samples, wherein the training dataset is associated with one or more driving environment scenarios and comprises one or more training sub-datasets, wherein each training sub-dataset is associated with each driving environment scenario and comprises one or more training samples of the plurality of training samples, and wherein each of the plurality of training samples comprises (i) a training 360-degree scene perception of road surroundings of a training host vehicle and (ii) one or more training 3-dimensional (3-D) scene semantics of the training host vehicle, associated with a plurality of training actors, wherein the one or more driving environment scenarios include (i) cut-in lane driving, (ii) driving through a hair pin bend road on a hill side, (iii) an abnormal/un-intentional lane change by the priority actors while the host vehicle in a blind spot, (iv) overtaking the host vehicle in a narrow lane, (v) a sudden close appearance of pedestrian/animal/other vehicle on road, (vi) merging lane and T-Junction situations, (vii) vehicle backing up, and (viii) target vehicle in an ego lane applied sudden brake, wherein the training dataset associated with (i) the cut-in lane driving includes the host vehicle speed and cut-in target vehicle speed (ii) the driving through the hair pin bend road on the hill side includes the host vehicle speed with no target vehicle present, the host vehicle speed and oncoming target vehicle speed, repeat the trained dataset with different road curvature (vi) the merging lane and T-Junction situations includes the host vehicle speed and the target vehicle is merging with the target vehicle speed, the host vehicle speed and the target vehicle is merging from T-junction with the target vehicle speed (viii) the target vehicle in the ego lane applied sudden brake includes the host vehicle speed and the target vehicle speed in the ego lane, the host vehicle speed and slow-moving target or stationary target in the ego lane;

processing each of the plurality of training samples present in each training sub-dataset to obtain a plurality of processed training samples from the plurality of training samples, wherein each processed training sample comprises a state and an action of each training priority actor and the training host vehicle, from (i) the training 360-degree scene perception of road surroundings and (ii) one or more training 3-dimensional (3-D) scene semantics;

assigning a training symbiotic warning signal of a plurality of symbiotic warning signals, for each processed training sample, based on the state and the action of each training priority actor and the training host vehicle; and training a deep reinforcement learning neural network model, with each processed training sample at a time using an associated training symbiotic warning signal assigned, until the plurality of processed training samples is completed, to obtain the symbiotic warning trained model;

taking automatic control of host vehicle communication devices including a horn, a headlight flash or communicate with a dedicated short-range communication (DSRC) technology to generate the symbiotic warning signal, to one or more priority actors including nearby target vehicles, pedestrians and animals, based on the decision to generate and based on type of the priority actor and the driving environment scenario; and controlling, via the one or more hardware processors, the host vehicle to avoid collisions with the one or more priority actors in response to the generated symbiotic warning signal, wherein the processor-implemented method is performed by a symbiotic warning system installed or equipped in the host vehicle.

2. The processor-implemented method of claim 1, wherein detecting one or more priority actors those lead to probable collisions, out of the one or more actors present on the road as the host vehicle navigates, based on the one or more 3-dimensional (3-D) scene semantics, using a path estimation and tracking technique, comprises:

detecting one or more actors of interest, from the one or more actors present on the road as the host vehicle navigates, using the path estimation and tracking technique;

determining one or more predicted moves of (i) each of the one or more actors of interest and (ii) the host vehicle, using the path estimation and tracking technique; and mapping (i) the one or more predicted moves and (ii) a current move, of each of the one or more actors of interest and the host vehicle, to detect the one or more priority actors those may lead to probable collisions, wherein the current move is a present movement in real time, wherein processing of output from Advanced driver-assistance systems (ADAS) system including Adaptive Cruise Control, Emergency braking system, Blind spot warning, Rear/Front cross traffic alert, Lateral collision warning is performed for reuse of existing algorithms and avoids repetition.

3. The processor-implemented method of claim 1, wherein deciding to generate the symbiotic warning signal of the one or more symbiotic warning signals, to one or more priority actors based on the one or more 3-dimensional (3-D) scene semantics and the 360-degree scene perception of road surroundings, using the symbiotic warning trained model, comprising:

determining a current state of the host vehicle and the one or more priority actors, using the 360-degree scene perception of road surroundings, wherein the state is associated with current dynamics of the each of the one or more priority actors on the road;

determining a current action for the host vehicle and the one or more priority actors, based on the current state of the host vehicle and the one or more priority actors, using the one or more 3-dimensional (3-D) scene semantics and the 360-degree scene perception of road surroundings, wherein the action describes one or more possible moves that each of the one or more priority actors and the host vehicle; and passing (i) the current state of the host vehicle and the one or more priority actors, (ii) the current action for the host vehicle and the one or more priority actors, to the symbiotic warning trained model, to decide whether to generate the symbiotic warning signal, to one or more priority actors those lead to probable collisions.

4. The processor-implemented method of claim 3, wherein training the deep reinforcement learning neural network model, with each processed training sample at a time using the associated training symbiotic warning signal assigned, until the plurality of processed training samples is completed, to obtain the symbiotic warning trained model, comprises:

passing the state of a training host vehicle, of each processed training sample, to a reinforcement learning (RL) agent of the deep reinforcement learning neural network model;

obtaining (i) a predicted action of each training priority actor and the training host vehicle, for a given state of the training host vehicle, and (ii) a predicted symbiotic warning signal, from each processed training sample, from the RL agent;

comparing (i) the predicted action of each training priority actor and the training host vehicle with the from each processed training sample with the action of each training priority actor and the training host vehicle, and (ii) the predicted symbiotic warning signal with the corresponding training symbiotic warning signal assigned, for each processed training sample, to provide a reward for the RL agent based on the comparison; and performing the training of the reinforcement learning (RL) agent with a successive processed training sample, until the plurality of processed training samples is completed, to maximize the reward for the RL agent.

5. The processor-implemented method of claim 1, wherein the one or more actors present on the road comprises one or more motorized and non-motorized vehicles, pedestrians, and animals present on the road surrounding the host vehicle.

6. The processor-implemented method of claim 1, wherein the symbiotic warning signal is generated through horn, headlights, a vehicle-vehicle to communication, and a combination thereof.

7. The processor-implemented method of claim 1, wherein the one or more road contextual parameters are associated with road modelling and the one or more road contextual parameters are received from one or more of: one or more 360-degree Lidars, one or more front corner radars, one or more rear corner radars, one or more cameras, one or more ultrasonic sensors, and one or more geographical road information devices, or a combination thereof, installed in the host vehicle.

8. The processor implemented method of claim 1, wherein the 360-degree scene perception of the road surroundings of the host vehicle provides a visual representation and allows the host vehicle to recognize and classify the one or more actors in the surrounding during the navigation of the host vehicle.

9. The processor implemented method of claim 1, wherein the one or more 3-D scene semantics includes a number of one or more motorized vehicles, one or more non-motorized vehicles, one or more pedestrians, a current distance between the host vehicle and each of the one or more motorized vehicles, the one or more non-motorized vehicles, the one or more pedestrians, an acceleration of each of the one or more motorized vehicles, the one or more non-motorized vehicles, dimensions and dynamics of each of the one or more motorized vehicles, the one or more non-motorized vehicles, a current moving direction of each of the one or more motorized vehicles, the one or more nonmotorized vehicles, the one or more pedestrians, wherein the localizing technique includes localization algorithms that to calculate a position and an orientation of the host vehicle with respect to the position of one or more actors in the road surroundings, wherein a visual odometry algorithm uses key points matching in consecutive video frames, wherein key points are the position and the orientation, wherein with each frame the key points are used as the an input to a mapping algorithm, wherein the mapping algorithm computes the position and orientation of each actor in a current frame with respect to previous frame and classifies all actors on the road.

10. The processor implemented method of claim 1, further comprising calculating a Time-to-collision (TTC), wherein the Time-To-collision is a distance between each actor and the host vehicle divided by their relative speed, wherein Time-to-collision is used for warning computation.

11. A system comprising:

a memory storing instructions;

one or more input/output (I/O) interfaces; and one or more hardware processors coupled to the memory via the one or more I/O interfaces, wherein the one or more hardware processors are configured by the instructions to:

receive one or more road contextual parameters to create a 360-degree scene perception of road surroundings of a host vehicle, wherein the 360-degree scene perception of road surroundings of the host vehicle comprises one or more actors present on a road as the host vehicle navigates on the road, wherein the 360-degree scene perception of the road surroundings of the host vehicle include one or more images and one or more sensor values;

estimate one or more 3-dimensional (3-D) scene semantics of each of the one or more actors present on the road as the host vehicle navigates, using the 360-degree scene perception of road surroundings, using a localizing technique;

detect one or more priority actors those lead to probable collisions with the host vehicle, out of the one or more actors present on the road as the host vehicle navigates, based on the one or more 3-dimensional (3-D) scene semantics, using a path estimation and tracking technique;

decide to generate a symbiotic warning signal, to one or more priority actors, based on the one or more 3-dimensional (3-D) scene semantics and the 360-degree scene perception of road surroundings, using a symbiotic warning trained model, wherein the symbiotic warning trained model is obtained by:

receiving a training dataset comprising a plurality of training samples, wherein the training dataset is associated with one or more driving environment scenarios and comprises one or more training sub-datasets, wherein each training sub-dataset is associated with each driving environment scenario and comprises one or more training samples of the plurality of training samples, and wherein each of the plurality of training samples comprises (i) a training 360-degree scene perception of road surroundings of a training host vehicle and (ii) one or more training 3-dimensional (3-D) scene semantics of the training host vehicle, associated with a plurality of training actors, wherein the one or more driving environment scenarios include (i) cut-in lane driving, (ii) driving through a hair pin bend road on a hill side, (iii) an abnormal/un-intentional lane change by the priority actors while the host vehicle in a blind spot, (iv) overtaking the host vehicle in a narrow lane, (v) a sudden close appearance of pedestrian/animal/other vehicle on road, (vi) merging lane and T-Junction situations, (vii) vehicle backing up, and (viii) target vehicle in an ego lane applied sudden brake, wherein the training dataset associated with (i) the cut-in lane driving includes the host vehicle speed and cut-in target vehicle speed (ii) the driving through the hair pin bend road on the hill side includes the host vehicle speed with no target vehicle present, the host vehicle speed and oncoming target vehicle speed, repeat the trained dataset with different road curvature (vi) the merging lane and T-Junction situations includes the host vehicle speed and the target vehicle is merging with the target vehicle speed, the host vehicle speed and the target vehicle is merging from T-junction with the target vehicle speed (viii) the target vehicle in the ego lane applied sudden brake includes the host vehicle speed and the target vehicle speed in the ego lane, the host vehicle speed and slow-moving target or stationary target in the ego lane;

processing each of the plurality of training samples present in each training sub-dataset to obtain a plurality of processed training samples from the plurality of training samples, wherein each processed training sample comprises a state and an action of each training priority actor and the training host vehicle, from (i) the training 360-degree scene perception of road surroundings and (ii) one or more training 3-dimensional (3-D) scene semantics;

assigning a training symbiotic warning signal of a plurality of symbiotic warning signals, for each processed training sample, based on the state and the action of each training priority actor and the training host vehicle; and training a deep reinforcement learning neural network model, with each processed training sample at a time using an associated training symbiotic warning signal assigned, until the plurality of processed training samples is completed, to obtain the symbiotic warning trained model;

take automatic control of host vehicle communication devices including a horn, a headlight flash or communicate with a dedicated short-range communication (DSRC) technology to generate the symbiotic warning signal, to one or more priority actors including nearby target vehicles, pedestrians and animals, based on the decision to generate and based on type of the priority actor and the driving environment scenario; and control the host vehicle to avoid collisions with the one or more priority actors in response to the generated symbiotic warning signal, wherein the processor-implemented method is performed by a symbiotic warning system installed or equipped in the host vehicle.

12. The system as claimed in claim 11, wherein the symbiotic warning and collision avoidance module is configured via the one or more hardware processors, to detect one or more priority actors those lead to probable collisions, out of the one or more actors present on the road as the host vehicle navigates, based on the one or more 3-dimensional (3-D) scene semantics, using a path estimation and tracking technique, by:

detecting one or more actors of interest, from the one or more actors present on the road as the host vehicle navigates, using the path estimation and tracking technique;

determining one or more predicted moves of (i) each of the one or more actors of interest and (ii) the host vehicle, using the path estimation and tracking technique; and mapping (i) the one or more predicted moves and (ii) a current move, of each of the one or more actors of interest and the host vehicle, to detect the one or more priority actors those may lead to probable collisions, wherein the current move is a present movement in real time, wherein processing of output from Advanced driver-assistance systems (ADAS) system including Adaptive Cruise Control, Emergency braking system, Blind spot warning, Rear/Front cross traffic alert, Lateral collision warning is performed for reuse of existing algorithms and avoids repetition.

13. The system as claimed in claim 11, wherein the symbiotic warning and collision avoidance module is configured via the one or more hardware processors, to decide to generate the symbiotic warning signal of the one or more symbiotic warning signals, to one or more priority actors based on the one or more 3-dimensional (3-D) scene semantics and the 360-degree scene perception of road surroundings, using the symbiotic warning trained model, by:

determining a current state of the host vehicle and the one or more priority actors, using the 360-degree scene perception of road surroundings, wherein the state is associated with current dynamics of the each of the one or more priority actors on the road;

determining a current action for the host vehicle and the one or more priority actors, based on the current state of the host vehicle and the one or more priority actors, using the one or more 3-dimensional (3-D) scene semantics and the 360-degree scene perception of road surroundings, wherein the action describes one or more possible moves that each of the one or more priority actors and the host vehicle; and passing (i) the current state of the host vehicle and the one or more priority actors, (ii) the current action for the host vehicle and the one or more priority actors, to the symbiotic warning trained model, to decide whether to generate the symbiotic warning signal, to one or more priority actors those lead to probable collisions.

14. The system as claimed in claim 11, wherein the one or more hardware processors are configured to train the deep reinforcement learning neural network model, with each processed training sample at time using the associated training symbiotic warning signal assigned, until the plurality of processed training samples is completed, to obtain the symbiotic warning trained model, by:

passing the state of a training host vehicle, of each processed training sample, to a reinforcement learning (RL) agent of the deep reinforcement learning neural network model;

obtaining (i) a predicted action of each training priority actor and the training host vehicle, for a given state of the training host vehicle, and (ii) a predicted symbiotic warning signal, from each processed training sample, from the RL agent;

comparing (i) the predicted action of each training priority actor and the training host vehicle with the from each processed training sample with the action of each training priority actor and the training host vehicle, and (ii) the predicted symbiotic warning signal with the corresponding training symbiotic warning signal assigned, for each processed training sample, to provide a reward for the RL agent based on the comparison; and performing the training of the reinforcement learning (RL) agent with a successive processed training sample, until the plurality of processed training samples is completed, to maximize the reward for the RL agent.

15. The system as claimed in claim 11, wherein the one or more actors present on the road comprises one or more motorized and non-motorized vehicles, pedestrians, and animals present on the road surrounding the host vehicle.

16. The system as claimed in claim 11, wherein the symbiotic warning signal is generated through horn, headlights, a vehicle-vehicle to communication, and a combination thereof.

17. The system as claimed in claim 11, wherein the one or more road contextual parameters are associated with road modelling and the one or more road contextual parameters are received from one or more of: one or more 360-degree Lidars, one or more front corner radars, one or more rear corner radars, one or more cameras, one or more ultrasonic sensors, and one or more geographical road information devices, or a combination thereof, installed in the host vehicle.

18. One or more non-transitory machine-readable information storage mediums comprising one or more instructions which when executed by one or more hardware processors cause:

receiving one or more road contextual parameters to create a 360-degree scene perception of road surroundings of a host vehicle, wherein the 360-degree scene perception of road surroundings of the host vehicle comprises one or more actors present on a road as the host vehicle navigates on the road, wherein the 360-degree scene perception of the road surroundings of the host vehicle include one or more images and one or more sensor values;

estimating one or more 3-dimensional scene semantics of each of the one or more actors present on the road as the host vehicle navigates, using the 360-degree scene perception of road surroundings, using a localizing technique;

detecting one or more priority actors those lead to probable collisions with the host vehicle, out of the one or more actors present on the road as the host vehicle navigates, based on the one or more 3-dimensional scene semantics, using a path estimation and tracking technique;

deciding to generate a symbiotic warning signal, to one or more priority actors, based on the one or more 3-dimensional scene semantics and the 360-degree scene perception of road surroundings, using a symbiotic warning trained model, wherein the symbiotic warning trained model is obtained by:

receiving a training dataset comprising a plurality of training samples, wherein the training dataset is associated with one or more driving environment scenarios and comprises one or more training sub-datasets, wherein each training sub-dataset is associated with each driving environment scenario and comprises one or more training samples of the plurality of training samples, and wherein each of the plurality of training samples comprises (i) a training 360-degree scene perception of road surroundings of a training host vehicle and (ii) one or more training 3-dimensional (3-D) scene semantics of the training host vehicle, associated with a plurality of training actors, wherein the one or more driving environment scenarios include (i) cut-in lane driving, (ii) driving through a hair pin bend road on a hill side, (iii) an abnormal/un-intentional lane change by the priority actors while the host vehicle in a blind spot, (iv) overtaking the host vehicle in a narrow lane, (v) a sudden close appearance of pedestrian/animal/other vehicle on road, (vi) merging lane and T-Junction situations, (vii) vehicle backing up, and (viii) target vehicle in an ego lane applied sudden brake, wherein the training dataset associated with (i) the cut-in lane driving includes the host vehicle speed and cut-in target vehicle speed (ii) the driving through the hair pin bend road on the hill side includes the host vehicle speed with no target vehicle present, the host vehicle speed and oncoming target vehicle speed, repeat the trained dataset with different road curvature (vi) the merging lane and T-Junction situations includes the host vehicle speed and the target vehicle is merging with the target vehicle speed, the host vehicle speed and the target vehicle is merging from T-junction with the target vehicle speed (viii) the target vehicle in the ego lane applied sudden brake includes the host vehicle speed and the target vehicle speed in the ego lane, the host vehicle speed and slow-moving target or stationary target in the ego lane;

processing each of the plurality of training samples present in each training sub-dataset to obtain a plurality of processed training samples from the plurality of training samples, wherein each processed training sample comprises a state and an action of each training priority actor and the training host vehicle, from (i) the training 360-degree scene perception of road surroundings and (ii) one or more training 3-dimensional (3-D) scene semantics;

assigning a training symbiotic warning signal of a plurality of symbiotic warning signals, for each processed training sample, based on the state and the action of each training priority actor and the training host vehicle; and training a deep reinforcement learning neural network model, with each processed training sample at a time using an associated training symbiotic warning signal assigned, until the plurality of processed training samples is completed, to obtain the symbiotic warning trained model;

taking automatic control of host vehicle communication devices including a horn, a headlight flash or communicate with a dedicated short-range communication (DSRC) technology to generate the symbiotic warning signal, to one or more priority actors including nearby target vehicles, pedestrians and animals, based on the decision to generate and based on type of the priority actor and the driving environment scenario; and controlling the host vehicle to avoid collisions with the one or more priority actors in response to the generated symbiotic warning signal, wherein the processor-implemented method is performed by a symbiotic warning system installed or equipped in the host vehicle.

\* \* \* \* \*